A. RICHARDS.
Improvement in Seed-Planters.

No. 126,985.

Patented May 21, 1872.

Witnesses:
E. Wolff.
Francis McArdle.

Inventor:
A. Richards
per Munn & Co.
Attorneys.

126,985

UNITED STATES PATENT OFFICE.

AUGUSTUS RICHARDS, OF ANDERSON, TEXAS.

IMPROVEMENT IN SEED-PLANTERS.

Specification forming part of Letters Patent No. 126,985, dated May 21, 1872.

Specification describing a certain Improvement in Seed-Planters, invented by AUGUSTUS RICHARDS, of Anderson, in the county of Grimes and State of Texas.

Figure 1:
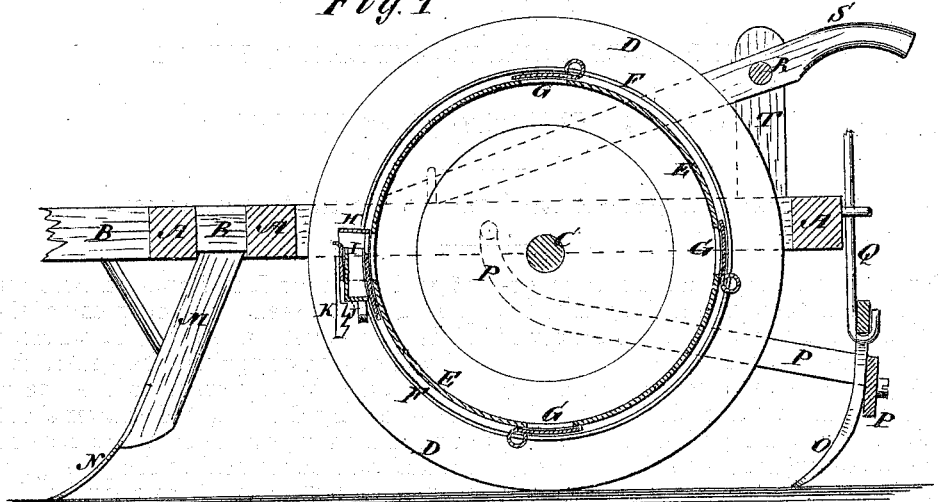
Figure 2:
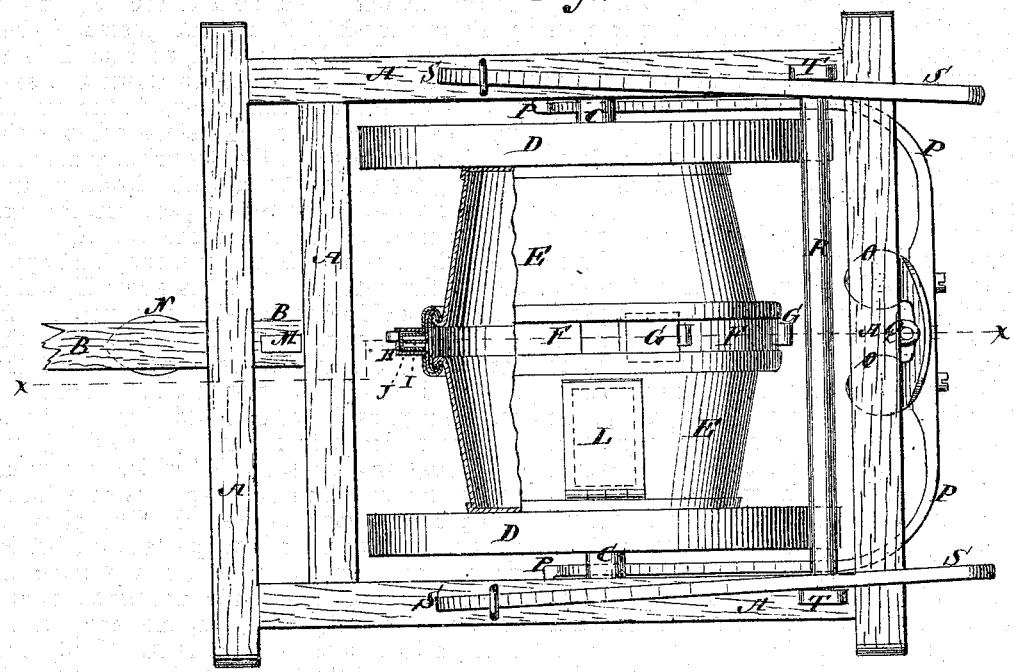

Figure 1 is a detail vertical section of my improved seed-planter, taken through the line $x\,x$, Fig. 2. Fig. 2 is a top view of the same, part of the seed-dropper being broken away to show the construction.

My invention has for its object to furnish a simple, convenient, and reliable machine for planting corn, cotton-seed, and other seeds, and which shall be so constructed that it may be conveniently adjusted to plant less or more seed, as may be desired; and it consists in the construction and combination of various parts of the machine, as hereinafter more fully described.

A is the frame of the machine, to the front cross-bars of which is attached the tongue B. C is a shaft, which revolves in bearings attached to the side bars of the frame A, and to it are attached two wheels, D. To the inner sides of the wheels D are attached the end parts E of the seed-dropper, which end parts E are made in the form of halves or barrels, the bilge of said parts having a tendency to move the seeds toward the middle part F of the dropper, through which they pass to the ground. The adjacent edges of the parts E are connected by a band or part, F, which may be formed solid with one or both of said parts, or may be seamed to one or both of said parts. The part or band F is set out a little further than the parts E, as shown in Figs. 1 and 2, so that the seed may always collect upon said part or band F. The part or band F has any desired number of discharge-openings formed in it, which are partially or wholly closed with slides G, so that by adjusting the said slides G the size of the said discharge-openings, and consequently the amount of seed dropped, may be regulated at will. The slides G are placed in grooved flanges formed upon or attached to the part or band F. If desired, the device H I J K may be used. In this device H is a box open at one end and with side flanges to enter the grooves upon the band or part F. The box H is made with a partition, I, extending longitudinally through its middle part, and in its bottom, upon one side of the partition I, and in its top upon the other side of said partition I, is formed a hole for the passage of the seed. The open end of the box H is closed with a drawer, J, which, when fully closed, rests against the end of the partition I, and wholly prevents the passage of the seed. By drawing the drawer J out less or more a passage smaller or larger, as may be desired, will be formed for the passage of the seed around the end of the partition I. The drawer is held in place by a spring, K, which has notches or teeth formed upon its lower side to take hold of the edge of the outer end of the drawer J and hold it securely in any position into which it may be adjusted. When the device H I J K is used, as each hole to which it is attached passes down the seed passes out through the opening in the band F into the box H. As the device ascends the seed drops back into the drawer J, some of it passing the end of the partition I, which part, as the device again descends, escapes, through the opening in the top of the box H, to the ground. The seed is put in through an opening in the side of one of the parts E, which opening is closed with a door or cover, L. To the forward part of the frame A, or to the tongue B, is secured the upper end of the standard M, to the lower end of which is attached a plow, N, of suitable shape and size to open a furrow to receive the seed. O are the covering-plows, two of which are used, and which may be made separate or solid in one piece, as may be desired. The plows O are attached to the middle parts of the bar P, which crosses the rear part of the machine, and the end parts of which are bent forward at or nearly at right angles, and are pivoted to the side bars of the frame A. The plows O are raised from the ground, when desired, by a rod, Q, the lower end of which is attached to the bar P or plows O, and which passes up through a guide-keeper attached to the frame A. The upper end of the rod Q is so formed that it may be hooked upon the rod R that connects the upper parts of the handles S. The lower or forward ends of the handles S are attached to the side bars of the frame A, and their upper parts are supported in proper position by the standards T, the lower ends of which are attached to the frame A. When the machine is to be used for planting cotton-seed the covering-plows O should be detached, as they would cover the seed too deep.

Having thus described my invention, I claim as new and desire to secure by Letters Patent—

The device H I J K, constructed substantially as herein shown and described, in combination with the dropper D E F, frame A, and furrowing-plow M N, as and for the purpose set forth.

AUGUSTUS RICHARDS.

Witnesses:
 ROBT. WHITLEY,
 G. W. REDING.